US 9,759,993 B2

United States Patent
Desai

(10) Patent No.: US 9,759,993 B2
(45) Date of Patent: Sep. 12, 2017

(54) COMPOSITE SCANNING MIRROR SYSTEMS

(76) Inventor: Shahyaan Desai, East Moriches, NY (US)

(*) Notice: Subject to any disclaimer, the term of this patent is extended or adjusted under 35 U.S.C. 154(b) by 1089 days.

(21) Appl. No.: 13/092,036

(22) Filed: Apr. 21, 2011

(65) Prior Publication Data

US 2011/0317235 A1     Dec. 29, 2011

Related U.S. Application Data

(60) Provisional application No. 61/326,347, filed on Apr. 21, 2010.

(51) Int. Cl.
| | | |
|---|---|---|
| *G02B 26/08* | (2006.01) | |
| *G03B 21/28* | (2006.01) | |
| *G02B 26/10* | (2006.01) | |
| *H04N 9/31* | (2006.01) | |

(52) U.S. Cl.
CPC ......... *G03B 21/28* (2013.01); *G02B 26/085* (2013.01); *G02B 26/105* (2013.01); *H04N 9/3129* (2013.01); *H04N 9/3173* (2013.01)

(58) Field of Classification Search
CPC .... C04B 2235/5244; C04B 2235/3826; C04B 14/386; C04B 2235/5248; C04B 35/806; C04B 35/488; C04B 35/58; C04B 41/85; G03B 21/14; G03B 21/28; H04N 9/3129; H04N 9/3173; G02B 26/085; G02B 26/105
USPC ............ 359/196.1–199.4, 200.6–200.8, 359/22.1–226.23, 220.1–226.23, 359/196.1–226.2, 220.1–226.2
See application file for complete search history.

(56) References Cited

U.S. PATENT DOCUMENTS

| | | | |
|---|---|---|---|
| 7,405,854 B2 | 7/2008 | Desai et al. | |
| 7,457,021 B2 | 11/2008 | Desai | |
| 7,616,367 B2 | 11/2009 | Desai | |
| 7,636,190 B2 | 12/2009 | Huibers | |
| 7,675,698 B2 | 3/2010 | Desai et al. | |
| 7,835,055 B2 | 11/2010 | Desai | |
| 8,416,482 B2 | 4/2013 | Desai | |
| 2001/0050758 A1 | 12/2001 | Suzuki et al. | |
| 2006/0007514 A1 | 1/2006 | Desai | |
| 2006/0120425 A1* | 6/2006 | Kouma ............ | G02B 26/0841 372/43.01 |

(Continued)

FOREIGN PATENT DOCUMENTS

| | | |
|---|---|---|
| JP | 2000-214407 A | 8/2000 |
| JP | 2007-526506 A | 9/2007 |

(Continued)

OTHER PUBLICATIONS

International Search Report for PCT/US2011/033495, mailed on Jan. 2, 2012 (4 pages).

(Continued)

*Primary Examiner* — James Phan
(74) *Attorney, Agent, or Firm* — Bond, Schoeneck & King, PLLC; William Greener

(57) ABSTRACT

In some aspects, the present disclosure is directed to, among other things, a device. The device may include a mirror with a first material and a pivoting system with a second material. The fracture toughness of the second material may be at least 20 M-Pa$(m^{1/2})$. The pivoting system may be configured to pivot the mirror around an axis.

9 Claims, 13 Drawing Sheets

(56) References Cited

U.S. PATENT DOCUMENTS

| | | | | |
|---|---|---|---|---|
| 2007/0268950 A1* | 11/2007 | Spinelli | ............ | G02B 26/0833 |
| | | | | 372/99 |
| 2008/0292899 A1* | 11/2008 | Tanimoto | ................ | B21B 3/00 |
| | | | | 428/593 |
| 2009/0206052 A1* | 8/2009 | Maeda | ............... | G02B 26/0833 |
| | | | | 216/24 |
| 2010/0025784 A1 | 2/2010 | Desai et al. | | |
| 2010/0079837 A1* | 4/2010 | Akedo | .................. | G02B 26/10 |
| | | | | 359/224.1 |
| 2010/0295414 A1 | 11/2010 | Desai et al. | | |

FOREIGN PATENT DOCUMENTS

| | | |
|---|---|---|
| JP | 2008-000870 A | 1/2008 |
| JP | 2009-186721 | 8/2009 |

OTHER PUBLICATIONS

Written Opinion for PCT/US2011/033495, mailed on Jan. 2, 2012 (5 pages).
International Preliminary Report on Patentability for PCT/US2011/033495, mailed Nov. 1, 2012 (7 pages).

\* cited by examiner

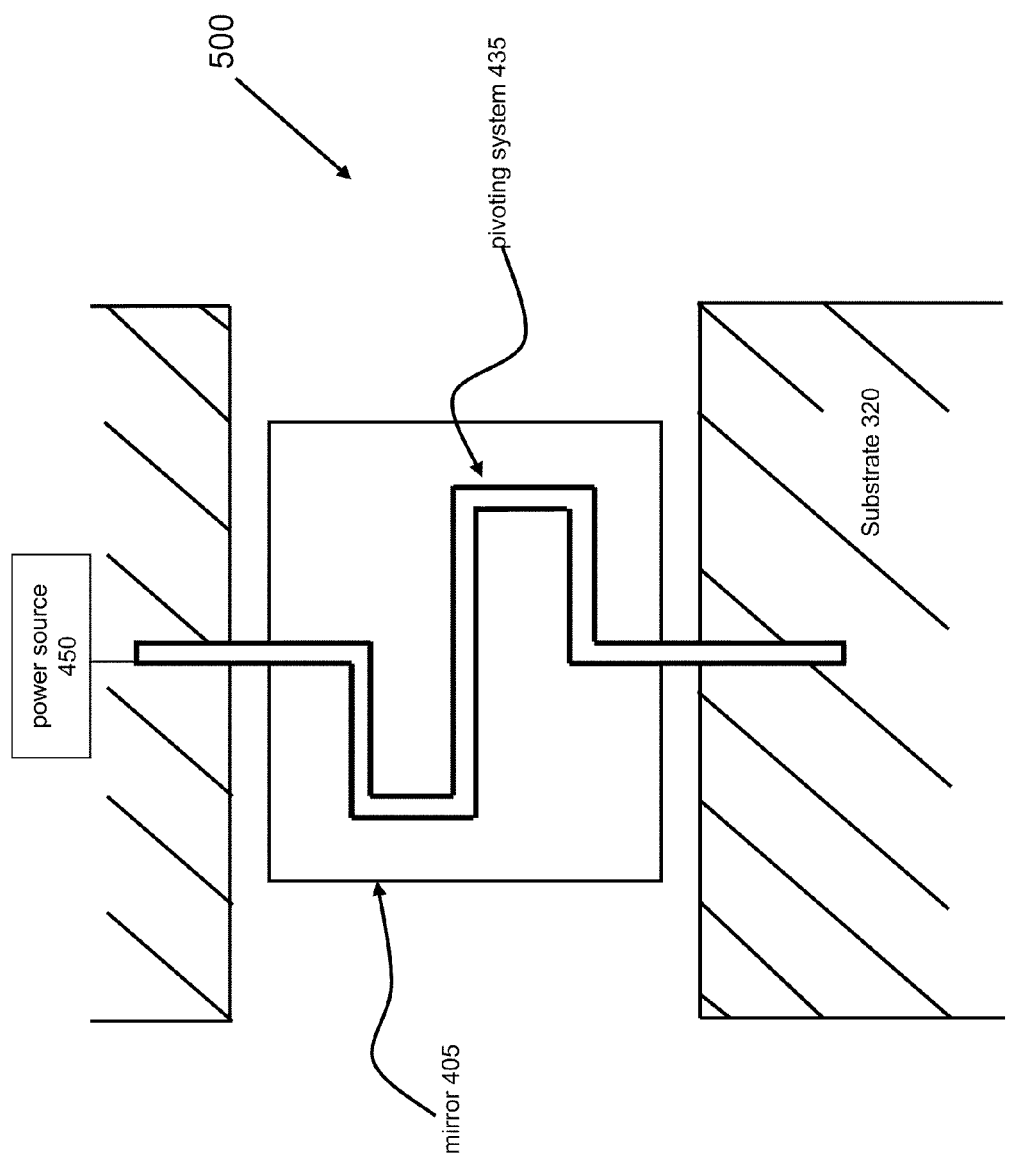

COMPOSITE SCANNING MIRROR SYSTEMS

RELATED APPLICATIONS

The present application claims priority to U.S. Provisional Application No. 61/326,347, entitled "Wire-Based Composite Micro-Mirror" and filed Apr. 21, 2010, which is hereby incorporated by reference in its entirety.

BACKGROUND

Scanning mirror systems may be used in myriad applications, from optical communications to laser displays to steering beams of light. In particular, laser illumination modules combined with scanning mirror systems that can scan laser light in two orthogonal directions may be simple, highly miniaturizable, and inexpensive portable image projection systems. The laser illumination modules combined with scanning mirror systems may be microelectromechanical systems (MEMS). Due their small size and capabilities, these projection systems may be utilized in various devices, from laptop computers to personal digital assistants or smart phones.

SUMMARY

In one aspect, the present disclosure is directed to a device. The device may include a mirror comprising a first material, and a pivoting system comprising a second material with a fracture toughness of at least 20 M-Pa$(m^{1/2})$. The pivoting system may be configured to pivot the mirror around an axis.

The pivoting system may be configured to pivot the mirror at a resonance frequency between about 5 kHz and about 50 kHz. The pivoting system may be configured to pivot the mirror at a resonance frequency at about 35 kHz. The pivoting system may be configured to pivot the mirror through an angular range of about 5 degrees and about 90 degrees. The pivoting system may be configured to pivot the mirror around two orthogonal axes.

The fracture toughness of the second material may be about 50 M-Pa$(m^{1/2})$. The second material may have a Young's modulus of at least 100 GPa. The second material may include at least one of steel, spring steel, titanium, graphite, boron, nitinol, carbon, or silicon carbide. The pivoting system may include at least one of wire or fiber. The fiber may include at least one of stranded fibers or braided fibers.

A portion of the second material may have a diameter between about 1 µm and about 500 µm. The first material of the mirror may have a stiffness of at least 50×10$^6$ Nm/kg. The first material of the mirror may have a stiffness of about 55×10$^6$ Nm/kg. The first material of the mirror may include at least one of silicon carbide, beryllium, silicon, carbon fiber, a composite of fibers, or diamond. The mirror may include a third material that forms a reflective surface. The third material may include at least one of gold, titanium, silver, or a dichroic film. A first segment of a portion of the second material may be perpendicular to a second segment of the portion of the second material. The device may include a power source that actuates the pivoting system to pivot the mirror around the axis. In another aspect, the present disclosure is directed to a device. The device includes a mirror including a first material with a groove; a pivoting system including a second material, wherein a portion of the second material may be aligned within the groove of the first material; and a third material that bonds the portion of the second material to the first material; wherein the pivoting system may be configured to pivot the mirror around an axis. The third material may include at least one of epoxy, frit, or solder.

In another aspect, the present disclosure is directed to a device. The device may include a mirror including a first material. The device may include a pivoting system comprising a second material different from the first material, wherein the pivoting system may be configured to pivot the mirror around an axis.

In another aspect, the present disclosure is directed to a system. The system may include a power source. The system may include a composite scanning mirror system comprising a mirror integrated with a pivoting system, wherein the pivoting system may be coupled to the power source and the mirror, and wherein the pivoting system is configured to pivot the mirror when actuated by the power source.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIGS. 4A, 4B, 5A, 5B, 6-8 are exemplary implementations of composite scanning mirror systems according to the present disclosure;

Figure 1:
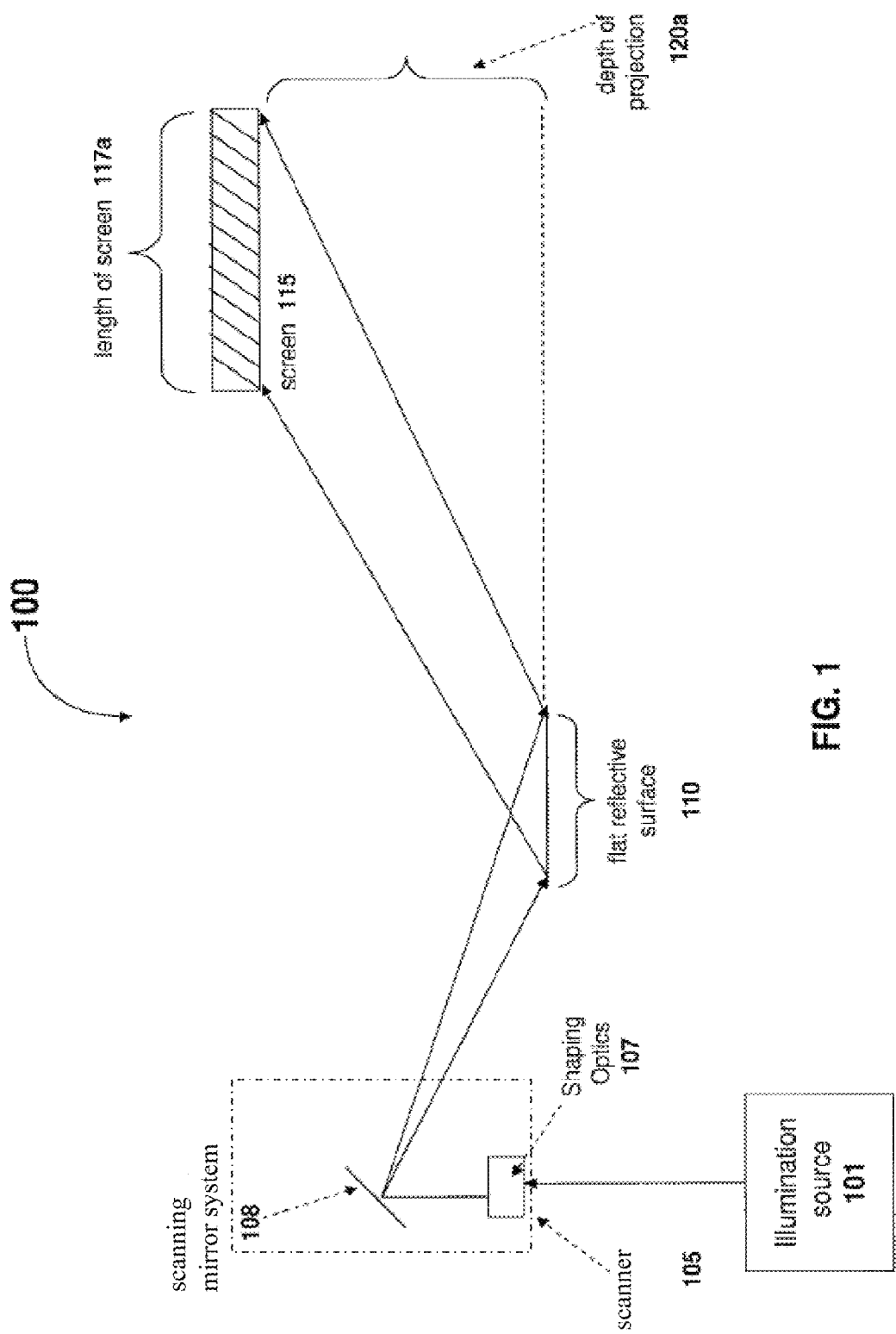
FIGS. 1-2 are block diagrams of exemplary systems for projecting an image.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present disclosure is directed to, among other things, composite scanning mirror systems that may be used to project high-resolution images.

Scanning mirror systems may be used in myriad applications, from optical communications to laser displays to steering beams of light. In particular, laser illumination modules combined with scanning mirror systems that can scan laser light in two orthogonal directions may be simple, highly miniaturizable, and inexpensive portable image projection systems. The laser illumination modules combined with scanning mirror systems may be microelectromechanical systems (MEMS). Due their small size and capabilities, these projection systems may be utilized in various devices, from laptop computers to personal digital assistants or smart phones.

Some scanning mirror systems may only be capable of scanning low-resolution images with satisfactory levels of quality. Monolithic materials (e.g., silicon, silicon derivatives, alternatives such as metals) that have traditionally been used to manufacture such devices may not have certain desirable material properties, such as the ability to store adequate strain energy without failure, to meet the fast scan speeds, exceeding tens of kilohertz, as well as the large scan angles required. Silicon-based mirrors may be prone to failure from mechanical shock when subjected to rapid oscillations. Steel-based mirrors may be strong enough to resist failure, but may not be stiff enough to maintain optical flatness during the scan.

Systems of the present disclosure may be designed to optimize the speed at which the mirrors may be pivoted. The design of a composite scanning mirror system may enhance the mirror's angular range, reduce fatigue on system's components, and increase the system's tolerance to mechanical damage. The design may allow the composite scanning mirror system to store strain energy without failure, meet fast scan speeds (e.g., speeds exceeding tens of KHz), and/or rotate through large scan angles. In some implementations, composite scanning mirror systems may be used in miniature, inexpensive portable image projection systems. In some implementations, composite scanning mirror systems may be used in other computing devices, such as laptop computers, personal digital assistants, or smart phones.

In some implementations, a projection system may include an illumination module (e.g., laser illumination module, light emitting diode (LED)-based light source) and a scanner with a composite scanning mirror system. In some implementations, the scanner may include a microelectromechanical system (MEMS). For example, the scanner may include a mirror used in a MEMS system. In some implementations, the system may include control electronics. In some implementations, a laser illumination module may include modulatable red (e.g., 600-650 nm), blue (e.g., 400-470 nm) and green (e.g., 490-560 nm) lasers. In some implementations, one or more of these laser may be directly modulatable. In some implementations, an external modulator may vary the intensity of a laser. For example, an unmodulatable green laser may be used with an etalon-based modulator to provide modulated green light.

In some implementations, color and intensity information of each pixel in an image may be encoded by varying the intensity of each color of an illumination source. For example, in a laser illumination module, each laser may be modulated, either via direct modulation of the current to the laser diode, or by modulating the voltage to a ferroelectric etalon modulator. Modulated beams may be combined into a single beam, using beam-combining optics. In some implementations, combination of the beams may be accomplished using wavelength selective elements that transmit or reflect light of specific wavelengths. For example, in one implementation, a modulated green beam may be reflected by a dichroic mirror designed to reflect only about 532 nm wavelength light. In another implementation, a modulated green beam may be reflected by a standard mirror. This beam may be transmitted through a mirror that permits about 532 nm light to be transmitted but reflects about 400-470 nm light from a blue beam. This blue-green beam may be transmitted through a mirror that transmits about 400-580 nm wavelengths, but reflects about 600-650 nm red light. In another implementation, the blue-green beam may be reflected from a mirror that reflects about 400-580 nm wavelengths, but transmits about 600-650 nm red light. In other implementations, the order of combination of beams may be altered. For example, in one such implementation, the red beam may be reflected and combined with the blue beam, and then the red-blue beam combined with the green beam.

In some implementations, the combined red-blue-green beam may be aligned to a composite scanning mirror system, discussed in more detail below, such that the modulated beam strikes a reflective surface of the system. The composite scanning mirror system may scan (e.g., raster scan) the combined beam in two dimensions to form a pixelated image on a surface, such as a wall, screen, table, or reflective sheet. In some implementations, the control electronics may convert pixel information for the image into current modulation functions for the modulatable light source. In many implementations, the control electronics may control the composite scanning mirror system's actuation and interpret position feedback to keep laser pulses synchronized with the position of a reflective surface of the system.

Referring now to FIG. 1, a block diagram of an exemplary implementation of a projection system 100 for projecting images and/or video using a composite scanning mirror system is shown and described. In brief overview, the system includes an illumination source 101 and a scanner 105. In some implementations, the system may include a reflective surface 110 and/or a screen 115. In some implementations, the system may be used to project against a wall, table, or other surface. In some implementations, the scanner 105 may include a scanning mirror system 108 and an ensemble of shaping optics 107.

In one implementation, the illumination source 101 may be used to produce one or more light rays to be projected on a screen or display unit. In some implementations, the illumination source 101 may comprise a laser source. In still other implementations, the illumination source 101 may be any other source of radiation as apparent to one skilled in the art.

The light ray produced by the illumination source 101 may be transmitted to the scanner 105. In one implementation, the light ray may comprise electromagnetic radiation of one or more wavelengths. In another implementation, the light ray may lie within the spectrum visible to human eye. In still another implementation, the light ray may lie in the ultra violet (UV) region of the spectrum. In yet another implementation, the light ray may lie in the infrared (IR) region of the spectrum.

In some implementations, the scanner 105 may include an ensemble of shaping optics 107. In some implementations, the shaping optics 107 may include one or more optical lenses. In some implementations, the shaping optics 107 may include optical filters. In some implementations, the shaping optics 107 may include a polarizer. In some implementations, the shaping optics 107 may include one or more of a multiplexer, reflector, prism and any other means for processing a light ray as apparent to one skilled in the art. In some implementations, the shaping optics 107 may be an active ensemble powered by a power source. In some implementations, the shaping optics 107 may be a passive ensemble.

In some implementations, the scanner 105 may receive the light ray produced by the illumination source and/or shaped by the shaping optics 107. The scanner 105 may reflect the light ray to a screen or secondary reflector. In some implementations, the scanning mirror system 108 may include a monolithic structure, such as a monocrystalline silicon, polycrystalline silicon, or a silicon on insulator (SOI) substrate. In some implementations, the scanning mirror system 108 may include a composite scanning mirror, e.g., a scanning mirror including a combination of two or more materials, described in more detail in reference to FIG. 4.

Figure 10:
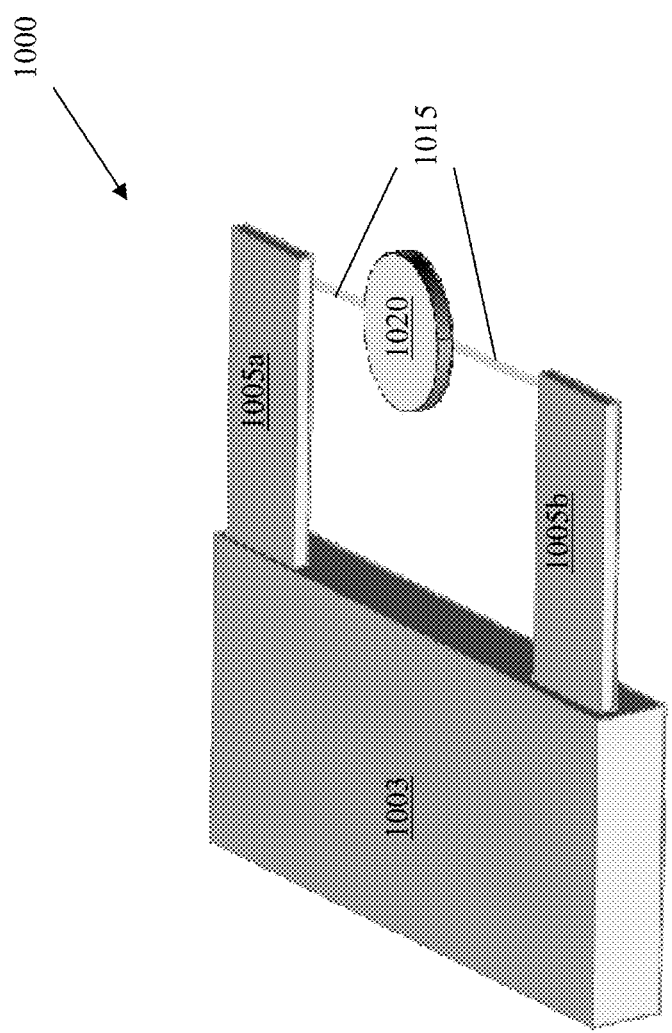
FIGS. 10-11 are exemplary implementations of scanning mirror systems.

In some implementations, the scanning mirror system 108 may include a mirror suspended from one or more cantilevers via a pivoting system (e.g., wires), described in more detail in FIG. 10. In some implementations, the wires may rotate to rotate the mirror. In some implementations, the cantilevers may deflect to rotate the mirror. As the cantilever deflects periodically, the periodic deflection may cause the mirror to oscillate. In some implementations, the scanning mirror system 108 may include a mirror suspended from one or more torsion bars via a pivoting system (e.g., wires), described in more detail in FIG. 11. A torsion bar and/or the wires may rotate to cause the mirror to rotate. In any of these implementations, as the torsion bar or wires rotate periodically, the periodic rotation may cause the mirror to oscillate.

The scanning mirror system 108 may reflect the light ray through an angular range to project an image. The number of pixels along a dimension of the image may be proportional to the angular range. In some implementations, the scanning mirror system 108 may scan an angular range between about 5 and about 90 degrees, although other bounds for the angular range may be used. The scanning mirror system 108 may scan the angular range at a high rate. In some implementations, the scanning mirror system 108 may scan the angular range at a resonant frequency. Exemplary resonance frequencies may be between about 5 kHz and about 50 kHz, although other resonant frequencies may be used. In some implementations, the resonant frequency may be about 35 kHz.

The systems in the present disclosure may be used in pico-projectors and/or other small portable projectors. The systems may be used in cellular phones, laptops, tablet computers, personal digital assistants, smart phones, portable video games, or larger image projection systems, including public displays, home or public theaters, or, e.g., any other video or image display systems.

Figure 2:
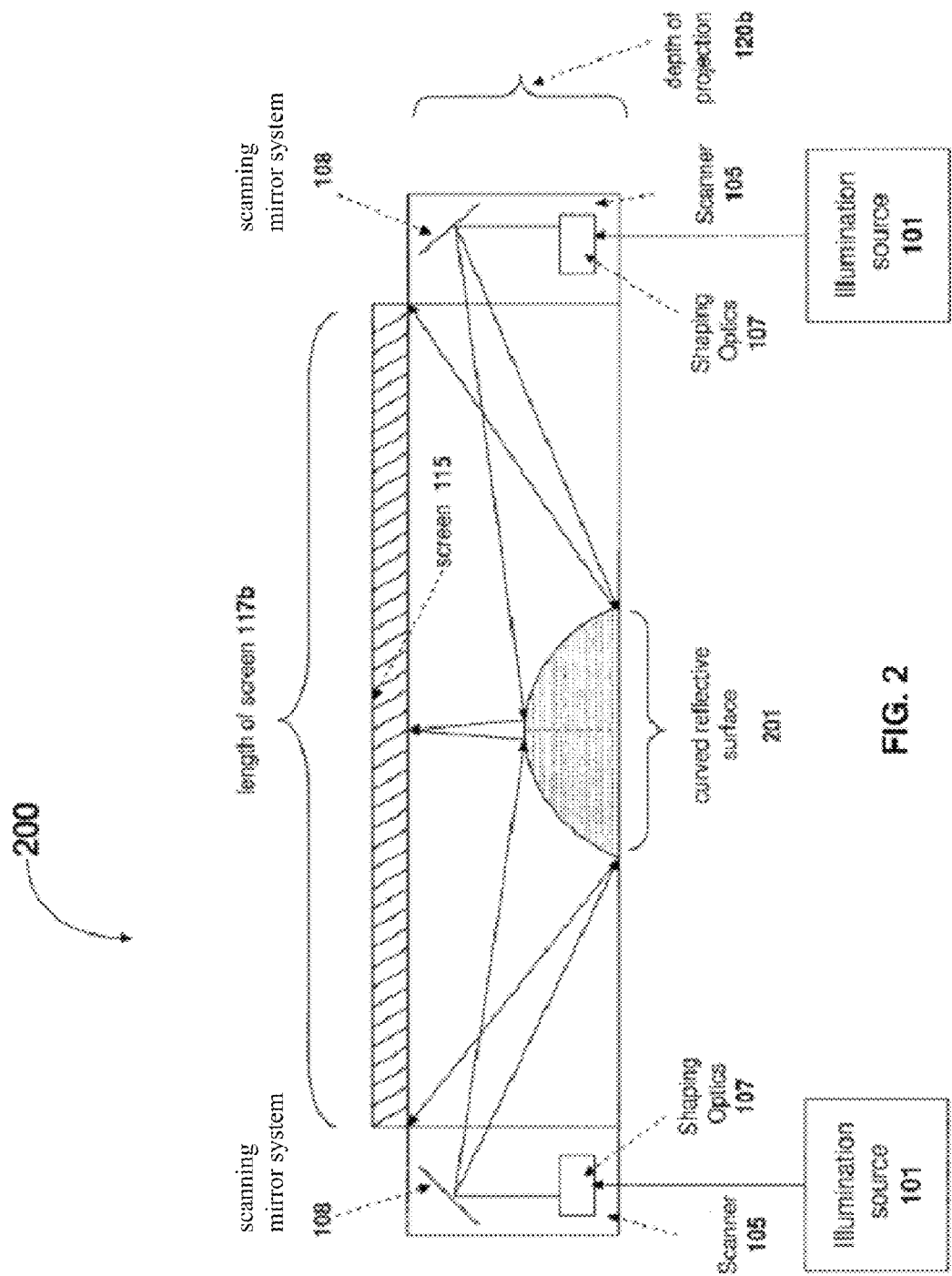

Referring now to FIG. 2, an implementation of a short depth projection system 200 is shown and described. The system may include one or more scanners 105a, 105b which may include shaping optics 107 and scanning mirror system 108. The system may include a curved reflective surface 201 and a screen 205 upon which an image or video may be projected.

In some implementations, the curved reflective surface 201 may include a cylindrical mirror. In some implementations, the curved reflective surface 201 may include a spherical mirror. In some implementations, the reflective surface 201 may include one or more curved solid surfaces. In some implementations, light rays from the reflective surface may be projected onto screen 115. In some implementations, screen 115 may include a diffused screen. In some implementations, screen 115 may include a graded index screen.

Figure 3:
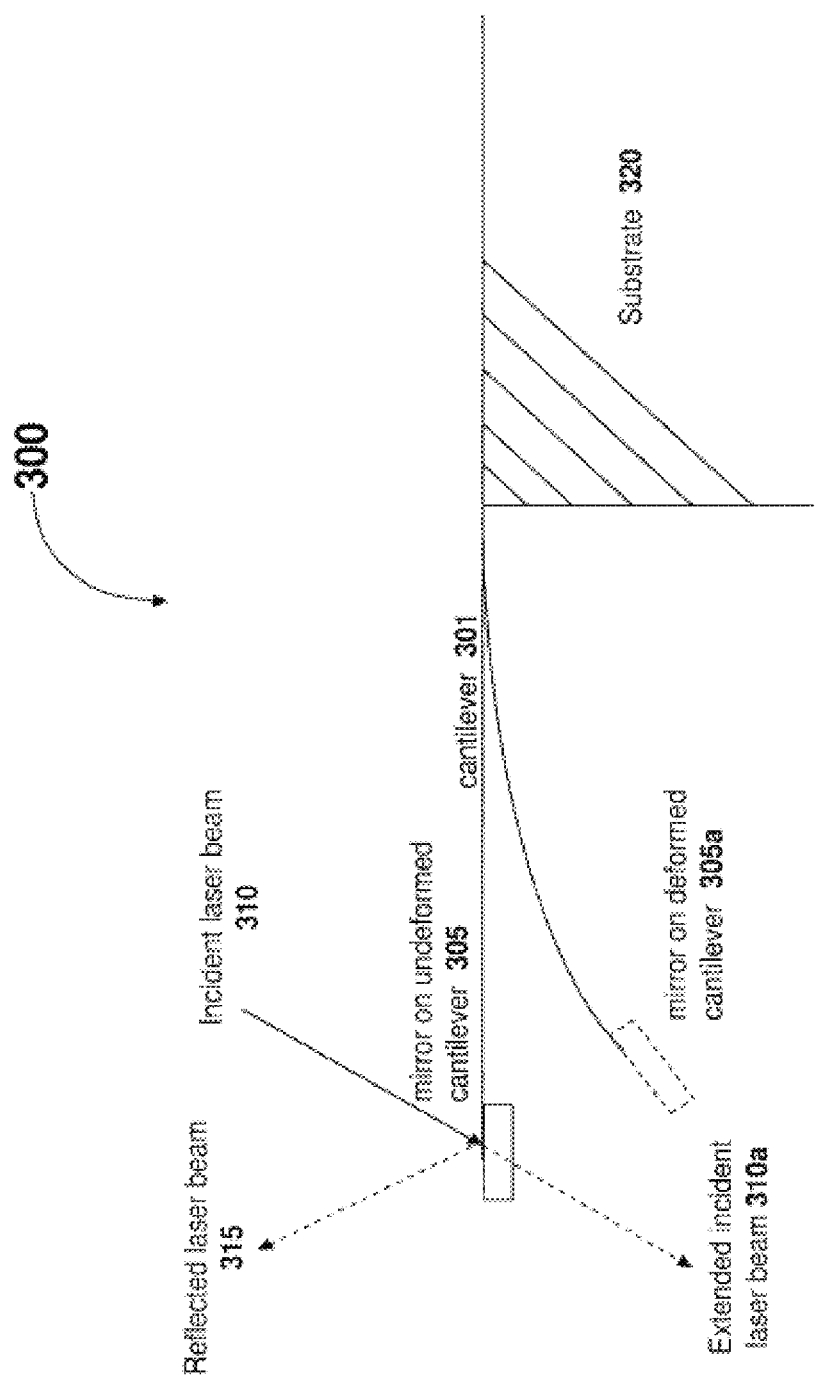
FIG. 3 is an exemplary implementation of a scanning mirror system.

Referring now to FIG. 3, an implementation of a cantilever-based mirror system 300 is shown and described. A mirror 305 may be fabricated on a cantilever 301 extending from a substrate 320. In an undeformed state of the cantilever 301, an incident laser beam 310 may strike the mirror 305 and a reflected laser beam 315 may be transmitted towards a reflective surface (not shown). In some implementations, the oscillation of the mirror 305 via the deformed cantilever 301 may render the mirror 305 in position 305a. In this configuration, the extended incident laser beam 310a may fail to strike the mirror 305a. The failure to strike the mirror may limit the scan capability of the cantilever-based scanning system. In some implementations, a cantilever-based system may suffer from problems of "beam-walking" Since the incident laser beam position may be fixed, during oscillation, the incident laser beam 310 may traverse or "walk" along the axis of deformation across the face of the mirror as the cantilever deflects. Thus, the mirror may cause distortions in the scan.

Figure 4A:
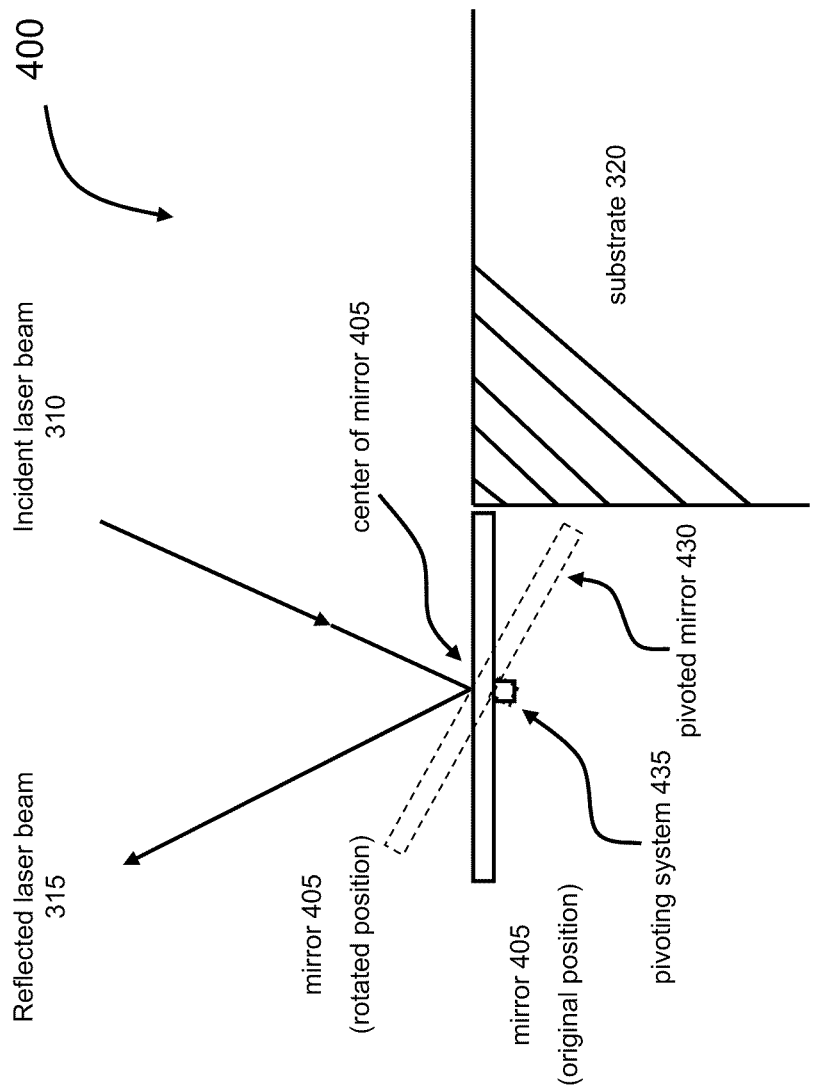

Referring now to FIG. 4A, an exemplary implementation of a scanning mirror system 400 is shown and described. The scanning mirror system 400 includes a mirror 405 and a pivoting system 435 attached to a substrate 320. In some implementations, the mirror 405 may be attached to a pivoting system 435 (e.g., flexure, torsion bar, cantilever, wire, or any combination thereof) such that rotation of the pivoting system 435 causes the mirror 405 to rotate to different positions. In some implementations, a portion of the pivoting system 435 may be placed at or along a central axis 425 of the mirror 405. The central axis 425 of the mirror 405 may remain stationary as the mirror 405 rotates, thereby reducing or eliminating beam-walking. Thus, the central axis 425 may define an axis around which the mirror 405 may pivot. In some implementations, the mirror 405 may rotate through a large angular range such that reflected laser beam 315 may be directed in a large number of angles. In some implementations, the pivoting system 435 may be integrated into the mirror 405.

In some embodiments, the mirror 405 may include a material that may be operated to alter the mirror 405. For example, operation of the fourth material may create motion in or of the mirror 405. In another example, operation of the fourth material may provide a support that reduces deformations in the mirror 405. In some implementations, the material may respond to an applied magnetic field to create motion and/or reduce deformations in the mirror 405. In some implementations, the material may respond to an applied current to create motion and/or reduce deformations in the mirror 405. Exemplary materials include lead zirconate titanate (PZT), a ferromagnetic film, a magnetostrictive film, an electrothermal film, a coil, or any combination thereof.

In some implementations, the scanning mirror system 400 may include a structure coupled to a power source, such as a piezoelectric actuator (not shown). Operation of the power source may transfer energy to the structure. The structure may transfer energy to the scanning mirror system 400, thereby creating motion or reducing deformation in the scanning mirror system 108. In some implementations, the motion and/or reduction of deformations may be achieved by exciting and/or or vibrating the pivoting system 435, mirror 405, and/or substrate 320 via piezoelectric, magnetic, electrostatic, mechanical, or other means.

Creating a high-resolution projected image using a mirror 405 may place requirements on the mirror's performance. The requirements may be based on an optically invariant equation of post-objective scanning:

$$N = \frac{(\theta \cdot D)}{(1.03 \cdot \lambda)}$$

Where:
N is the maximum number of pixels that can be resolved in a scan;
θ is the maximum mechanical angle scanned by the mirror;

D is the maximum clear aperture of the mirror (usually mirror diameter); and

λ is the wavelength of the light beam being scanned.

The equation may define the maximum number of pixels that can be scanned in one dimension (e.g., along a line) by a substantially flat mirror. The mirror may have spatial requirements. Larger scan angles may result in more resolvable pixels in a scanned line, thereby increasing the resolution of a projected image.

In some implementations, to create a two-dimensional (2D) array of pixels, each scanned line in the array may need to be sequentially scanned in an orthogonal direction. The time period between the beginning of the first line scanned and the end of the last line scanned in an image may be 1/60$^{th}$ of a second for video images. In some implementations, different video formats may use faster or slower periods of time. In some implementations, the mirror may be subject to temporal requirements. For example, the faster the mirror scans a line, the more lines the mirror may scan within a time period to create an image. Thus, the mirror 405 may scan to project images of increasing high resolution. To project such images, the mirror 405 may be required to move at high speeds through large scan angles.

In some implementations, the pivoting system 435 may include one or more materials that enable the scanning mirror system 400 to rotate through large angular ranges at high speeds. Materials with high measures of fracture toughness, high yield strength and/or high Young's modulus may exhibit reduced likelihood of failure in the scanning mirror system due to shock. In some implementations, an exemplary material used in the pivoting system 435 may have a fracture toughness ($K_{IC}$) of at least 20 MPam$^{1/2}$. In some implementations, the material may have a fracture toughness of about 50 MPam$^{1/2}$, although materials of other fracture toughnesses may be used. In some implementations, an exemplary material used in the pivoting system 435 may have a Young's modulus larger than 100 GPa. In some implementations, a material's modulus may be about 150 GPa. In some implementations, an exemplary material used in the pivoting system 435 may have a yield strength over 2.5 GPa.

In some implementations, exemplary materials used in the pivoting system 435 include steel, spring steel, titanium, graphite, boron, nitinol, carbon, boron, and silicon carbide. The pivoting system 435 may use any combination of these materials or, e.g., any other materials with high fracture toughness and a high ability to store elastic energy. In some implementations, the pivoting system 435 may use a combination of silicon with another material. In some implementations, the pivoting system 435 may use a combination of a silicon derivative with another material. In some implementations, the pivoting system 435 may use a combination of a metal with another material.

In some implementations, one or more materials used in the pivoting system 435 is formed as a wire, solid wire, stranded fibers, braided fibers, an array of fibers, an array of wires, or any combination thereof. In some implementations, the one or more materials used in the pivoting system 435 may have a diameter of between about 1 µm and about 500 µm, although other dimensions may be used.

In some implementations, the pivoting system 435 may include a flexure. In some implementations, the pivoting system 435 may include a wire. In some implementations, the pivoting system 435 may include a torsion element.

In some implementations, the mirror 405 may have a width or diameter between about 0.5 mm and about 10 mm. The diameter of the mirror 405 may be 1.0 mm. The diameter of the mirror 405 may be 1.1 mm. In some implementations, the mirror 405 may include one or more materials that forms a reflective surface. Exemplary materials for the reflective surface may include gold, titanium, silver, a dichroic film, or any combination thereof.

To maintain optical resolution, in some implementations, the mirror 405 may be optically flat to within a quarter of the smallest wavelength of light reflected by the mirror 405. In some implementations, the maximum variation in surface height that can be tolerated may be approximately 100 nm. For a mirror 405, deviation from flatness may be defined by $$\Delta = \frac{\{0.183 \cdot \rho \cdot L^5 \cdot (2 \cdot \pi \cdot f \cdot \theta)^2 \cdot (1-v)^2\}}{E \cdot t^3}$$

Where:

Δ is the deformation of the mirror away from perfect flatness;

ρ is the density of the mirror material;

L is the length of the mirror perpendicular to the scan axis;

f is the scanning frequency;

v is the Poisson's ratio of the mirror material;

E is the Young's modulus of the mirror material; and t is the thickness of the mirror.

In some implementations, for a given mirror length and thickness, larger scan angles, faster scan speeds, and higher density mirror materials may cause greater deviation from flatness.

In some implementations, the mirror 405 may include one or more materials with high levels of stiffness. The material(s) of high stiffness may be coupled to the one or more materials forming a reflective surface. For example, a material of high stiffness may adhere to at least a portion of the material forming a reflective surface, such as a surface area of the reflective material.

In some implementations, an exemplary material used in the mirror 405 may have a stiffness of at least 50×10$^6$ Nm/kg. In some implementations, an exemplary material used in the mirror 405 may have a stiffness of 55×10$^6$ Nm/kg. In some implementations, an exemplary material may have a high Young's modulus, such as a modulus larger than 100 GPa. An exemplary reflective material may have a low density, such as a density lower than 4 g/cc.

In some implementations, the mirror 405 may include silicon carbide, beryllium, silicon, carbon, diamond, or any combination thereof. In some implementations, the mirror 405 may include a composite of fibers. Exemplary composites of fibers may include boron fibers, silicon fibers, diamond whiskers, ultra high modulus carbon (e.g., a modulus more than about 250 GPa), or any combination thereof.

Figure 4B:
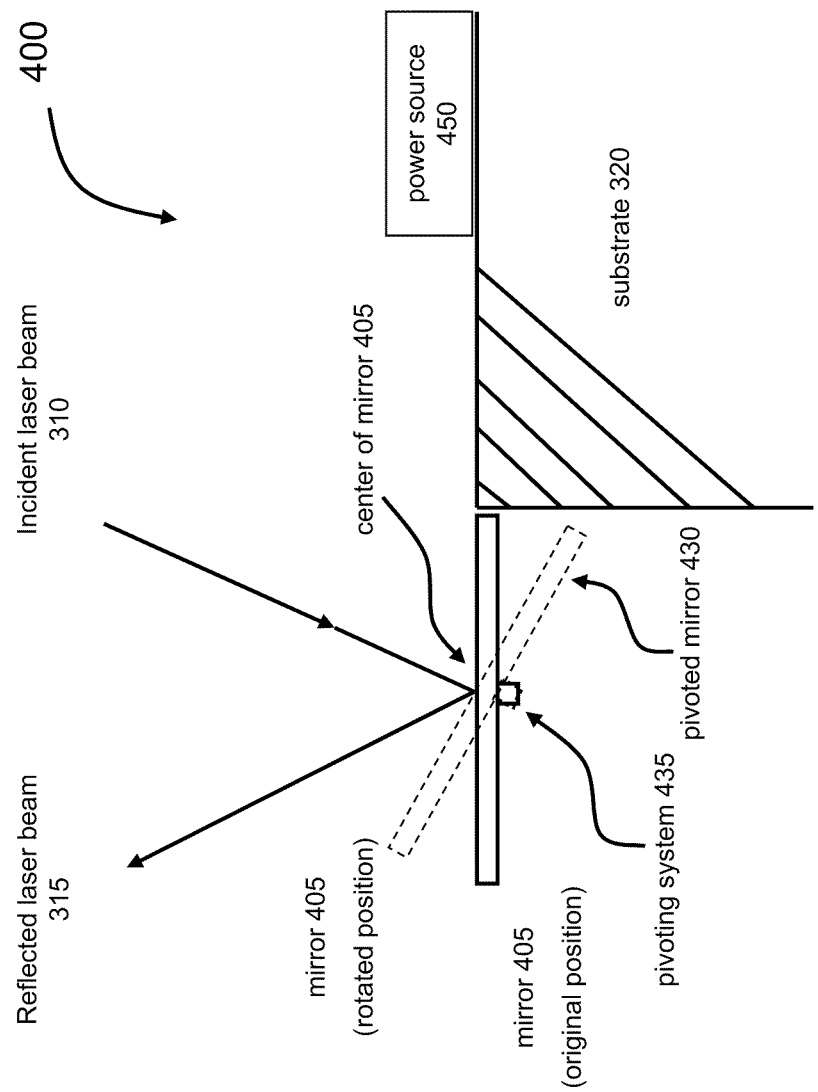

Referring now to FIG. 4B, an exemplary implementation of a scanning mirror system is shown and described. In addition to the components described in reference to FIG. 4A, the scanning mirror system may include a power source 450. The power source may be coupled to the pivoting system 435, the mirror 405, or both. In some implementations, the scanning mirror system includes more than one power sources 450. Separate power sources 450 may be connected to the mirror 405 and the pivoting system 435.

The power source 450 may transfer energy to the pivoting system 435. In response, the pivoting system 435 may pivot to rotate the mirror 405. In some implementations, the power source 450 may be an actuator, such as a piezoelectric actuator, although other types of power sources may be used.

Figure 5A:
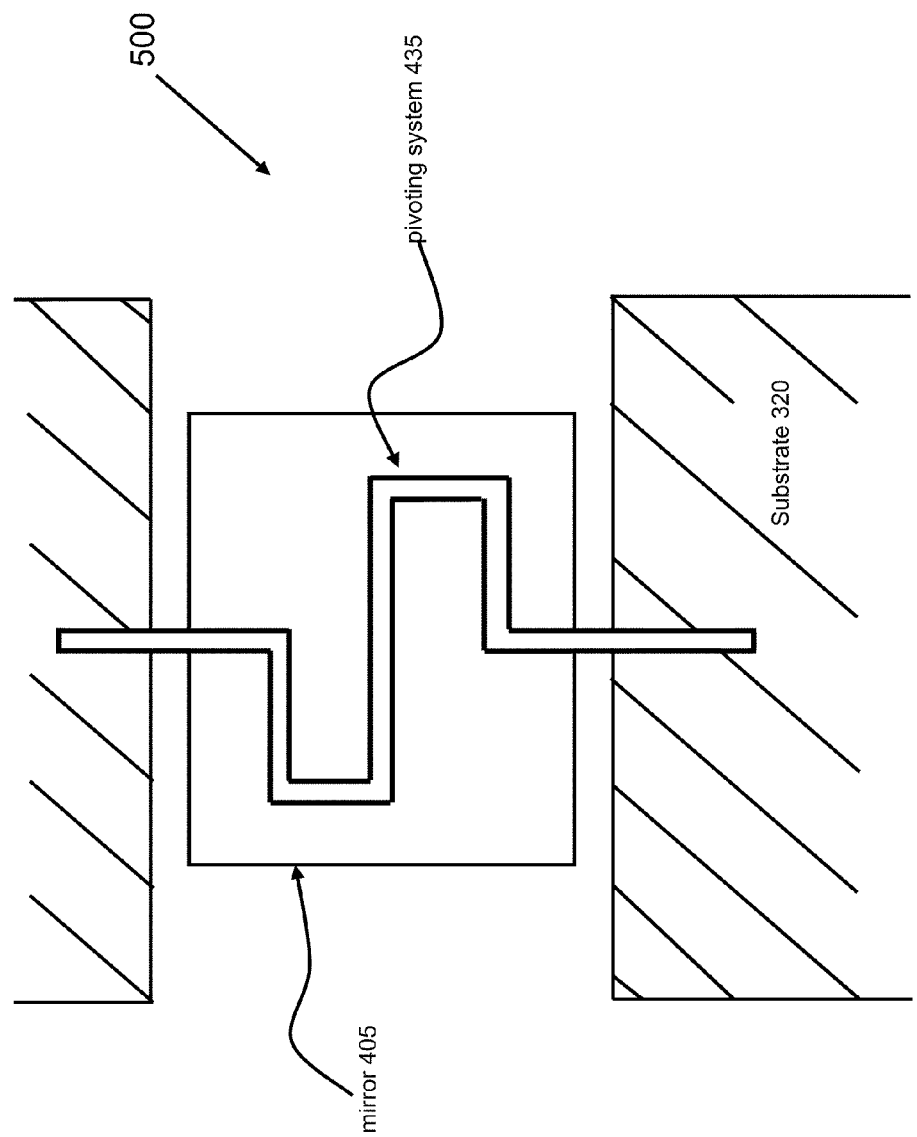

Referring now to FIG. 5A, an exemplary implementation of a composite scanning mirror system 500 is shown and described. The composite scanning mirror system 500 may include a composite scanning mirror 403, a pivoting system 435', and a substrate 320. The pivoting system 435' may include a wire. A portion of the wire may be bonded to the mirror 403. A portion of the wire may be bonded to the substrate 320. Thus, the substrate 320 may support the composite scanning mirror 430. The mirror 430 may rotate and/or oscillate around an axis defined by a portion of the wire.

In some implementations, the wire may extend beyond the composite scanning mirror 430 in two directions along an axial line. In some implementations, the wire may change direction at least once within the region bounded by the mirror 405. In the implementation shown in FIG. 5, the wire may change direction six times across the mirror 405. Segments of the wire bonded to the mirror 405 may be perpendicular to one another. The changes in direction may allow the wire to contact a greater surface area of the mirror 405, thereby reducing stress on the mirror and/or bonding material adhering the wire and mirror 405 during oscillation.

Referring now to FIG. 5B, an exemplary implementation of a composite scanning mirror system is shown and described. In addition to the components described in reference to FIG. 5A, the scanning mirror system may include a power source 450. The power source may be coupled to the pivoting system 435. The power source 450 may transfer energy to the pivoting system 435. In response, the pivoting system 435 may pivot to rotate the mirror 405. In some implementations, the power source 450 may be an actuator, such as a piezoelectric actuator, although other types of power sources may be used.

Figure 6:
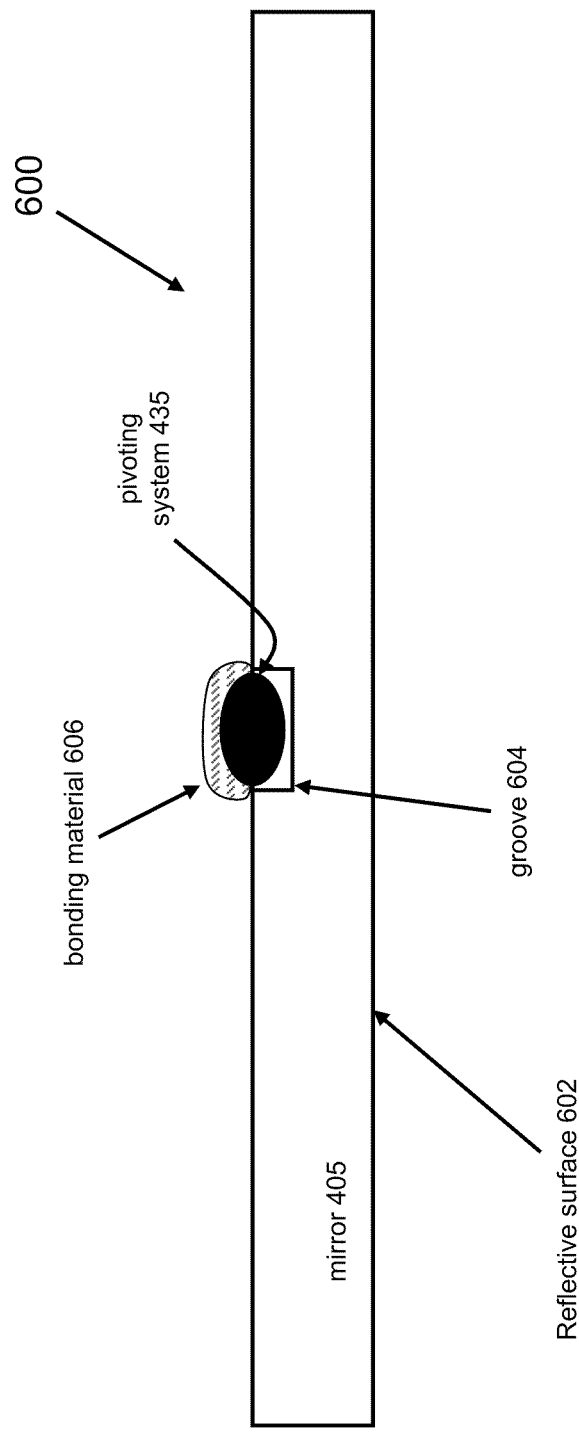

Referring now to FIG. 6, an implementation of a composite scanning mirror system 600 is shown and described. The composite scanning mirror system may include a mirror 405 and a pivoting system 435. At least a portion of the pivoting system 435 (e.g., a wire or portion thereof) may be bonded to the mirror 405 via a bonding material 606. The pivoting system 435 may be integrated into the mirror 405.

The mirror 405 may include material that forms a reflective surface 602. In some implementation, the mirror 405 may include a single material forming a reflective surface 602. In some implementations, the scanning mirror 405 may include two or more materials, wherein one of the materials form a reflective surface 602. For example, a mirror 405 may include a first non-reflective, stiff material. The scanning mirror 405 may include a second reflective material bonded to the first material along its entire length and/or width. Thus, the second material may be supported by the stiffness of the first material. For example, the first material may be a carbon fiber element, and the second material may be a reflective foil, such as gold, titanium, silver, or another element, or may comprise a dichroic film.

The mirror 405 may include a groove 604. The groove 604 may be micro-machined into the mirror 405 (e.g., a reflective material, a stiff material supporting the reflective material). In some implementations, the groove 604 may have depth to ease alignment of a wire with the mirror 405. For example, the groove 604 may have a depth equal to or greater than a diameter or height of the wire. In some implementations, the groove may have a depth less than the diameter or height of the wire 435. In some implementations, the depth of the groove 604 and/or the diameter or height of the wire may be between about 10 µm and about 500 µm. In some implementations, the ratio of the depth of the groove 604 to the width or diameter of a wire is between about 20 and about 500.

In some implementations, the mirror 405 and/or pivoting system 435 may be treated to prepare the mirror 405 and/or pivoting system 435 for the bonding material 606. The treatment may improve the bond formed by the bonding material. Exemplary treatments may include plasma treatments, the deposition of chemically functional groups, or any combination thereof.

In some implementations, the bonding material 606 may be dispensed in the groove 604. A wire of the pivoting system 435 may be aligned in the groove 604. In some implementations, the bonding material 606 may be left to cure. In some implementations, heat may be applied to the bonding material 606 for the material 606 to adhere the wire to the mirror 405. In some implementations, the bonding material 606 may encapsulate the wire 435. In various embodiments, the bonding material 606 may be an epoxy, solder, frit, or any combination thereof.

Figure 7:
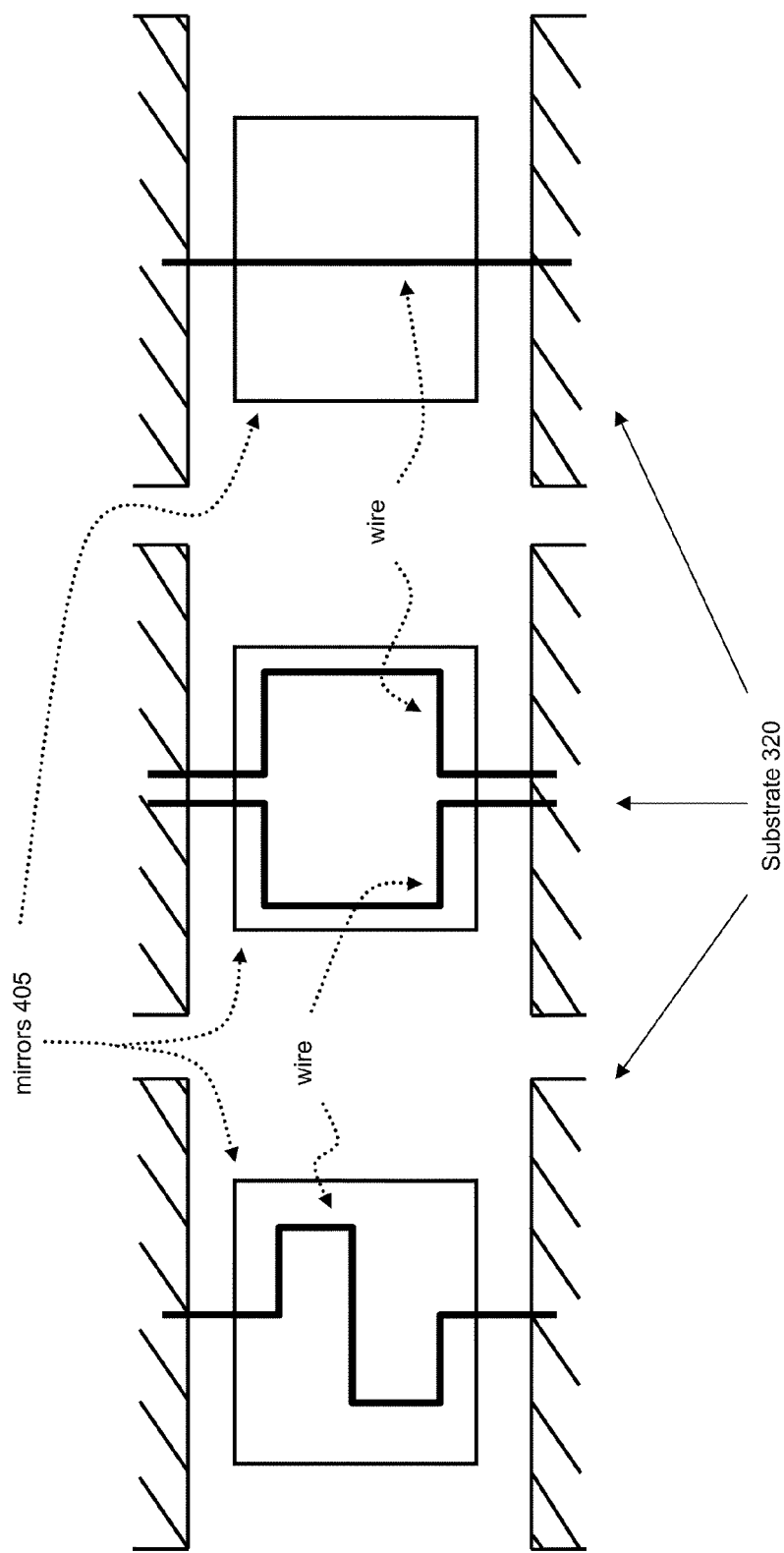
Figure 8:
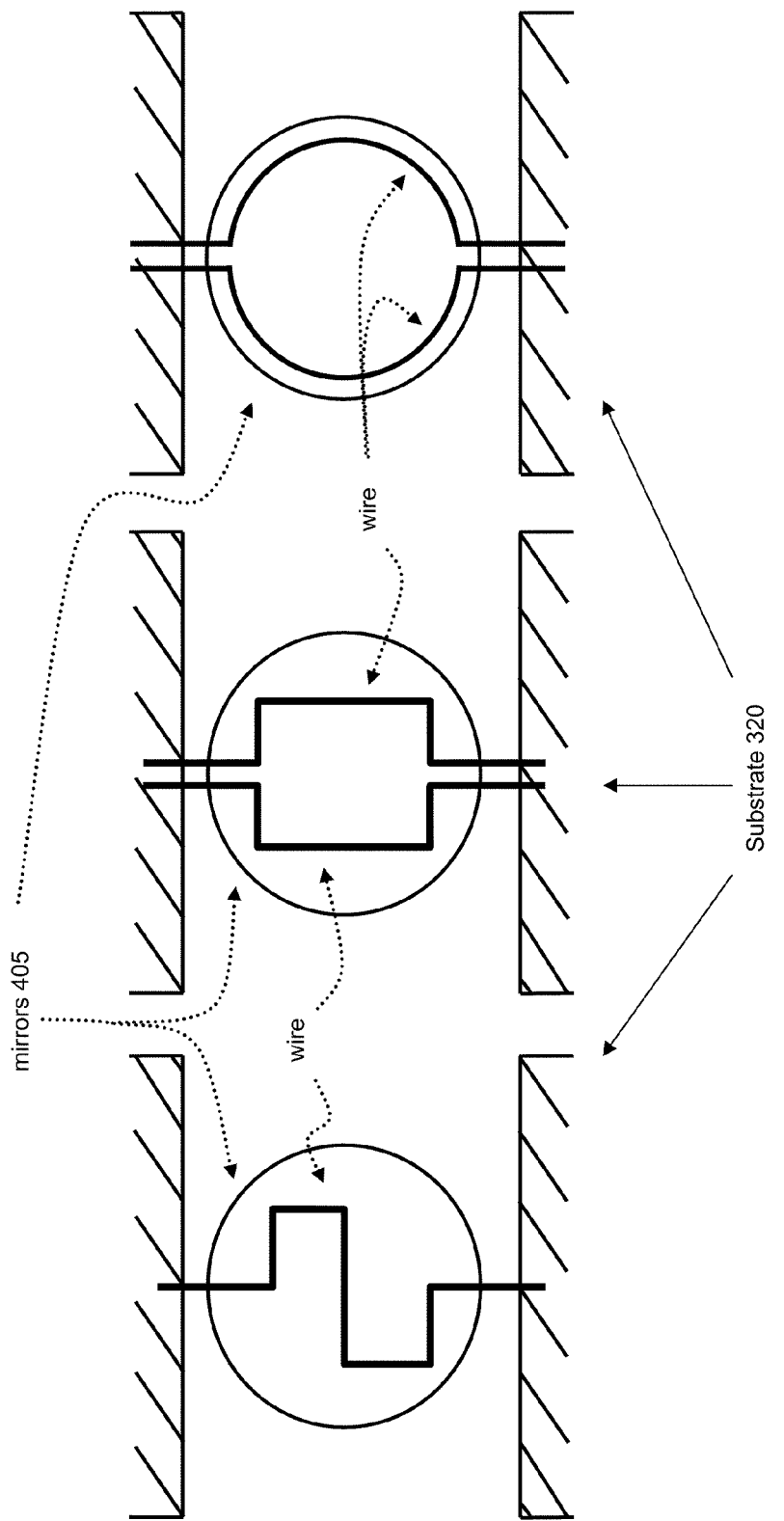

Referring now to FIGS. 7 and 8, implementations of composite scanning mirrors systems are shown and described. In some implementations, one or more wires of pivoting systems 435 may be bonded to mirrors 405 and/or substrates 320. The path of a wire may vary across the mirror 430, changing direction one or more times. In some implementations, two wires 435 may be used and oriented such that the second wire follows a path that is a mirror-image of a path of the first wire, across the centerline of the mirror 405. Although implementations with one or two wire are shown, in other implementations not illustrated, three, four, five, or more wires may be used.

Although only one axis of rotation is shown in FIGS. 7 and 8, the substrate 320 may be fabricated as a frame. The substrate 320 may be attached via one or more similar wires on an orthogonal, but co-planar, axis to a second substrate, allowing two dimensional scanning capability.

Figure 9:
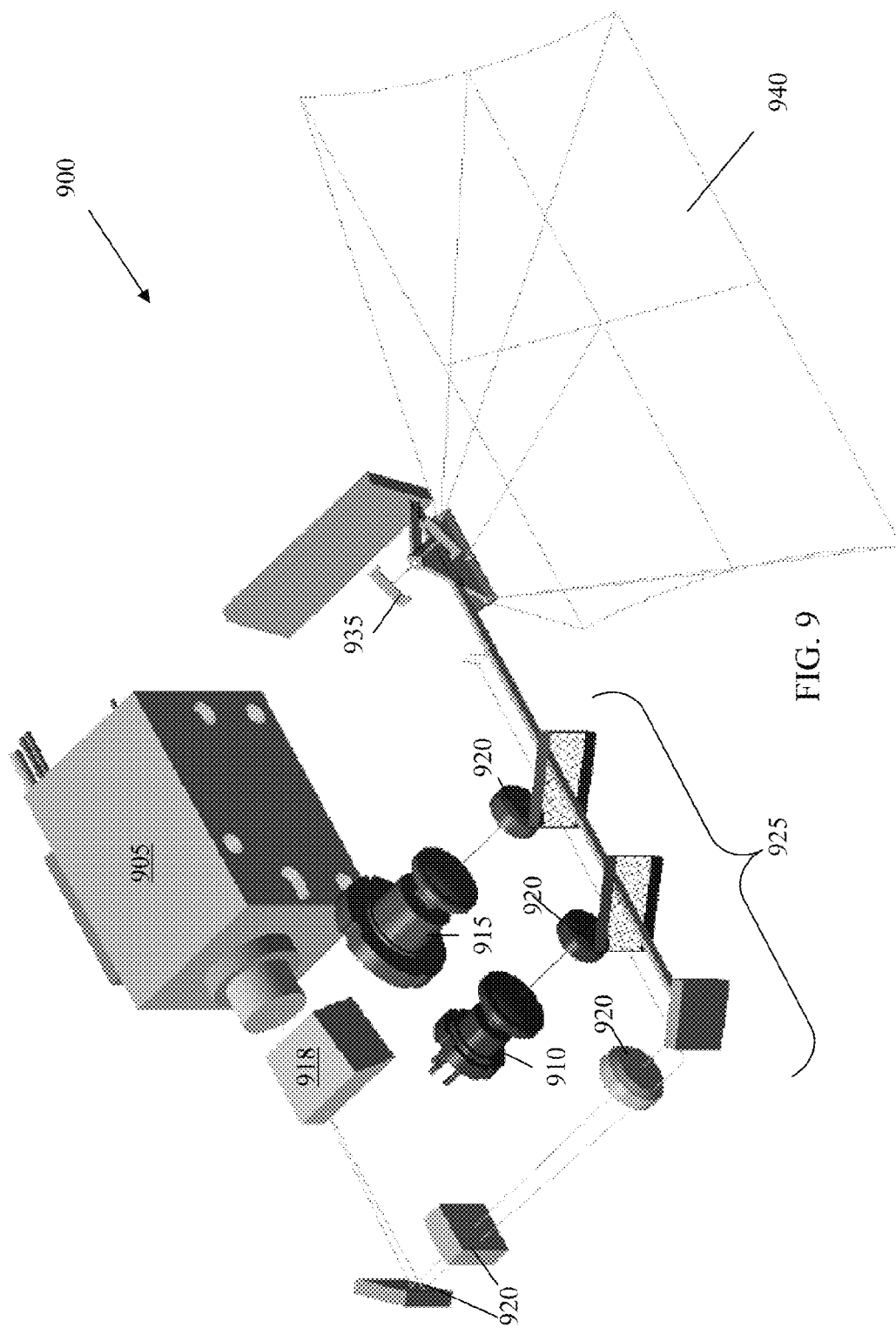
FIG. 9 is a block diagram of an exemplary systems for projecting an image that combines red, blue, and green laser light.

Referring now to FIG. 9, a block diagram of an exemplary system 900 for projecting an image that combines red, blue, and green laser light is shown and described. The system 900 may include green 905, blue 910, and red 915 laser light sources. In some implementations, the system 900 may include a modulator 918 for modulating light from the green laser light source 905. Shaping optics 920 may shape light emitted from the laser light sources 905, 910, 915. Combining optics 925 may combine light from the green, blue, and red laser light sources 905, 910, 915. The combining optics 925 may transmit the combined light to a composite scanning mirror system 935 of the present disclosure. A mirror of the composite scanning mirror system 935 may be rotated to project an image 940 onto a surface, such as a wall or a projection screen.

The systems in the present disclosure may be used in pico-projectors and/or other small portable projectors. The systems may be used in cellular phones, laptops, tablet computers, personal digital assistants, smart phones, portable video games, or larger image projection systems, including public displays, home or public theaters, or, e.g., any other video or image display systems.

Figure 11:
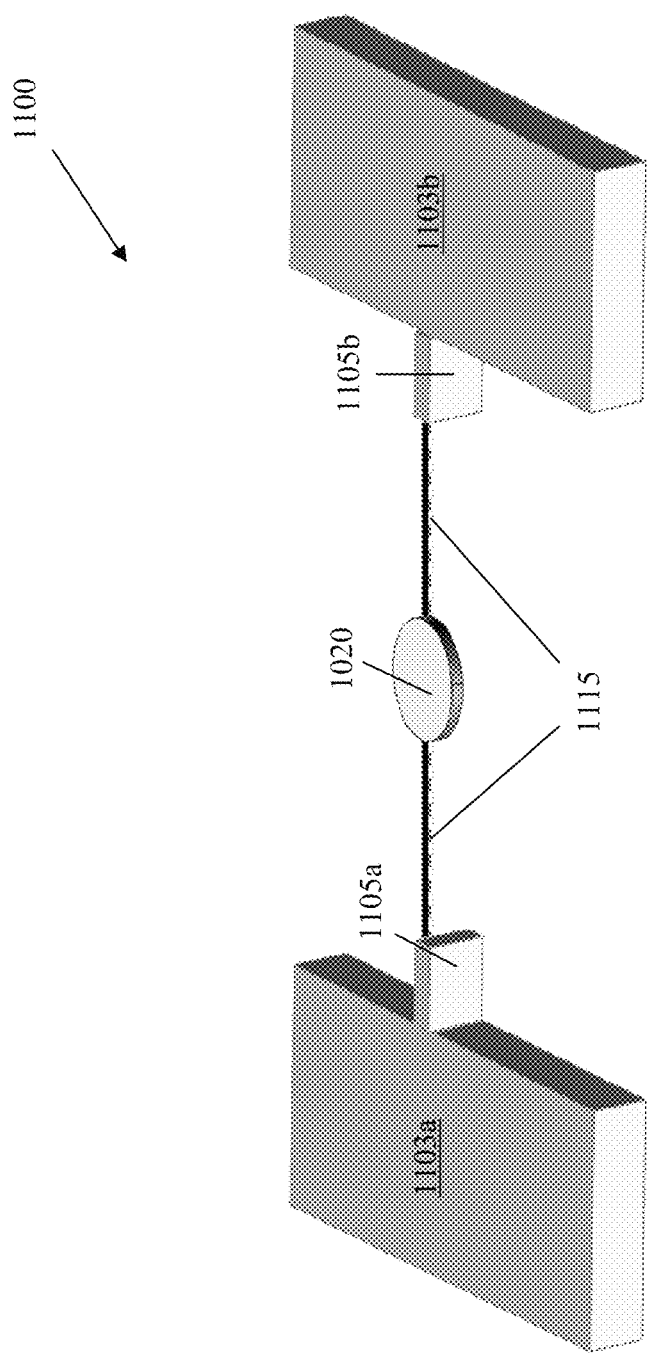

Referring now to FIGS. 10-11, exemplary implementations of scanning mirror systems are shown and described. In FIG. 10, an exemplary scanning mirror system 1000 may include a substrate 1003. One or more cantilevers 1005a, 1005b may project from the substrate 1000. Wires 1015 may connect a mirror 1020 to the cantilevers 1005. In some implementations, the wires 1015 and/or the mirror 1020 may be coupled to a power source (not shown). Application of power (e.g., current, magnetic field) to the wires 1015 and/or the mirror 1020 may cause the mirror to rotate, thereby scanning an angular range. In some implementations, the cantilevers 1005 may be coupled to the power source. Application of power to the cantilevers 1005 may cause the cantilevers 1005 to deflect, thereby rotating the mirror through an angular range.

In FIG. 11, an exemplary scanning mirror system 1100 may include one or more substrates 1103. One or more torsion bars 1105*a*, 1105*b* may abut the substrates 1103. Wires 1115 may connect a mirror 1120 to the torsion bars 1105. In some implementations, the wires 1015 and/or the mirror 1020 may be coupled to a power source (not shown). Application of power (e.g., current, magnetic field) to the wires 1015 and/or the mirror 1020 may cause the mirror to rotate, thereby scanning an angular range. In some implementations, the torsion bars 1105 may be coupled to the power source. Application of power to the torsion bars 1105 may cause the torsion bars 1105 to rotate through an angular range.

In some implementations, a scanning mirror system 1000, 1100 may include a mirror mounted on a combination of at least one torsion bar and at least one cantilever. In some implementations, the scanning mirror system 1000, 1100 may include a mirror mounted on one or more cantilevers placed non-axially such that their actuation causes the mirror to rotate.

Further Exemplary Implementations

In some implementations, a device includes a mirror coupled to a pivoting system, wherein the pivoting may be configured to pivot the mirror around an axis. The mirror and/or pivoting system may be any of the mirrors or pivoting systems described in reference to any of the preceding FIGS. 1-11.

The pivoting system may be integrated into the mirror, and/or vice versa. The pivoting system may include one or more wires. A wire may include a material different from a material used for the mirror (e.g., the wire may be formed from steel or spring steel, while the mirror may be formed from silicon).

In some implementations, the steel and/or spring steel used for the wire may have a fracture toughness larger than about 50 M-Pa(m$^{1/2}$). In some implementations, the steel and/or spring steel used for the wire may have a yield strength of at least 2.5 GPa. In some implementations, the steel and/or spring steel used for the wire may have a yield strength between about 2.5 GPa and about 4.0 GPa. In some implementations, the steel and/or spring steel used for the wire may have a Young's modulus between about 180 GPa and about 280 GPa. In some implementations, the steel and/or spring steel used for the wire may have a Young's modulus of about 210 GPa. In some implementations, the steel and/or spring steel used for the wire may have any combination of values for its fracture toughness, yield strength, and Young's modulus as described herein.

In some implementations, the steel and/or spring steel used for the wire may be fatigue resistant and/or fatigue-free. For example, the material behaviors of the steel and/or spring steel may remain constant after the pivoting system has pivoted the mirror over an angular range about one million (1,000,000) times, e.g., after 1,000,000 cycles. In another example, the material behaviors of the steel and/or spring steel may remain constant after the pivoting system has pivoted the mirror over an angular range between 2-5 billion (2,000,000,000-5,000,000,000) times, e.g., after 2,000,000,000-5,000,000,000 cycles.

In some implementations, after the pivoting system has pivoted the mirror according to the number of cycles described herein, the fracture toughness, yield strength, and/or Young's modulus of the steel and/or spring steel may remain constant relative to their values prior to the cycles. In some implementations, after the pivoting system has pivoted the mirror according to the number of cycles described herein, the fracture toughness, yield strength, and/or Young's modulus of the steel and/or spring steel may remain within a predetermined percentage of their values prior to the cycles. In some implementations, the predetermined percentage may be less than 5%, or any other percentage as would be understood by one of ordinary skill in the art.

In some implementations, the wire may have a diameter between about 50 µm and about 5 mm. In some implementations, the wire may have a diameter of about 100 µm.

In some implementations, a portion of the wire may form any of the patterns shown in FIGS. 5A, 5B, 7, and 8. In some implementations, a portion of the wire may include a curve. In some implementations, portions of the wire may be perpendicular to one another. In some implementations, a portion of the wire may follow a border of the mirror. In some implementations, one or more wires may form a symmetrical pattern around an axis of the mirror.

While various implementations of the methods and systems have been described, these implementations are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary implementations and should be defined in accordance with the accompanying claims and their equivalents.

What is claimed:

1. A device comprising:
a mirror comprising a non-metallic material; and
a pivoting system comprising at least two sections of a metallic wire having a fracture toughness of at least 20 MPa(m$^{1/2}$) and a Young's modulus of at least 100 GPa that extend beyond opposing boundaries of the mirror along a rotation axis of the mirror,
wherein the pivoting system is configured to pivot the mirror about the rotation axis at a resonance frequency between about 5 kHz and about 50 kHz and through an angular range of about 5 degrees and about 90 degrees.

2. The device of claim 1, wherein the pivoting system is configured to pivot the mirror at a resonance frequency at about 35 kHz.

3. The device of claim 1, wherein the metallic wire has a fracture toughness of equal to or greater than 50 M-Pa(m$^{1/2}$).

4. The device of claim 1, wherein the first material of the mirror has a stiffness of at least 50×10$^6$ Nm/kg.

5. The device of claim 1, wherein the first material of the mirror has a stiffness of about 55×10$^6$ Nm/kg.

6. The device of claim 1, wherein the first material of the mirror comprises at least one of silicon carbide, silicon, carbon fiber, a composite of fibers, and diamond.

7. The device of claim 1, wherein the mirror further comprises a third material that forms a reflective surface.

8. The device of claim 7, wherein the third material comprises at least one of gold, titanium, silver, and a dichroic film.

9. The device of claim 1, wherein a segment of a portion of one of the at least two metallic wire sections is perpendicular to a segment of a portion of another one of the at least two metallic wire sections.

\* \* \* \* \*